United States Patent
Matsushima et al.

(10) Patent No.: US 12,241,852 B2
(45) Date of Patent: Mar. 4, 2025

(54) GAS SENSOR AND METHOD FOR PRODUCING ALKALINE EARTH FERRITE

(71) Applicants: National Institute of Technology, Tokyo (JP); KOA Corporation, Ina (JP)

(72) Inventors: Shigenori Matsushima, Fukuoka (JP); Kenji Obata, Fukuoka (JP); Kenichi Iguchi, Nagano (JP); Yukiko Ota, Nagano (JP); Hisakazu Nagata, Nagano (JP); Koichi Urano, Nagano (JP)

(73) Assignees: National Institute of Technology, Tokyo (JP); KOA Corporation, Nagano (JP)

( * ) Notice: Subject to any disclaimer, the term of this patent is extended or adjusted under 35 U.S.C. 154(b) by 58 days.

(21) Appl. No.: 17/754,126

(22) PCT Filed: Aug. 26, 2020

(86) PCT No.: PCT/JP2020/032227
§ 371 (c)(1),
(2) Date: Mar. 24, 2022

(87) PCT Pub. No.: WO2021/059839
PCT Pub. Date: Apr. 1, 2021

(65) Prior Publication Data
US 2022/0291160 A1   Sep. 15, 2022

(30) Foreign Application Priority Data
Sep. 24, 2019 (JP) .................. 2019-173525

(51) Int. Cl.
*G01N 27/12* (2006.01)
*C01G 49/00* (2006.01)

(52) U.S. Cl.
CPC ....... *G01N 27/125* (2013.01); *C01G 49/0036* (2013.01); *C01P 2006/40* (2013.01)

(58) Field of Classification Search
CPC ...... G01N 27/15; G01N 27/12; G01N 27/127; C01G 49/0036
See application file for complete search history.

(56) References Cited

U.S. PATENT DOCUMENTS

2004/0007462 A1* 1/2004 Hotta ................. G01N 27/4075
204/429
2006/0044144 A1* 3/2006 Duval ................ A61B 5/14546
340/576

(Continued)

FOREIGN PATENT DOCUMENTS

JP       2015-083530 A      4/2015

OTHER PUBLICATIONS

International Search Report, Application No. PCT/JP2020/032227, mailed Nov. 24, 2020. ISA/Japan Patent Office.
(Continued)

*Primary Examiner* — Dominic E Hawkins
(74) *Attorney, Agent, or Firm* — Honigman LLP

(57) ABSTRACT

The gas sensor is provided with: a base material; a first electrode and a second electrode arranged on the base material; and a gas detection member connected to the first electrode and the second electrode, wherein the gas detection member contains flaky particles of alkaline earth ferrite.

10 Claims, 20 Drawing Sheets

(56) References Cited

U.S. PATENT DOCUMENTS

| | | | |
|---|---|---|---|
| 2006/0257288 A1* | 11/2006 | Sun | G01N 27/404 422/89 |
| 2007/0071651 A1* | 3/2007 | Kato | G01N 33/0052 422/83 |
| 2008/0105545 A1* | 5/2008 | Nakagaki | G01N 27/419 204/424 |
| 2015/0061706 A1 | 3/2015 | Kotnala et al. | |
| 2017/0167999 A1 | 6/2017 | Akasaka | |
| 2018/0106754 A1* | 4/2018 | Kozuka | C01F 17/32 |
| 2019/0079041 A1* | 3/2019 | Sinitskii | G01N 27/127 |
| 2020/0003718 A1* | 1/2020 | Bartsch | G01N 27/128 |

OTHER PUBLICATIONS

Chemical Sensors, Apr. 5, 2018, vol. 35, Supplement B (2019), Obata Kenji et al., "CO2 Sensing Properties of a CaFe2O4 Thick-Film-Type Gas Sensor".

Chemical Sensors, Apr. 5, 2018, vol. 35, Supplement B (2019), Obata Kenji et al., "CO Sensing Properties of Lanthanoid—Added MgFe2O4".

Concise Explanation Chemical Sensors, Sep. 5, 2019, vol. 35, Supplement B, 2019, pp. 10-12. Obata, Kenji et al., "CO2 sensing properties of CaFe2O4 Thick-Film-Type Gas Sensor".

* cited by examiner

GAS DETECTING REACTION : $O_{ads}^- + CO_2 + e^- \rightarrow CO_3^{2-}{}_{ads}$ $O_{ads}^-$ : NEGATIVE CHARGED ADSORBED OXYGEN GAS DETECTING REACTION : $M\text{-}O_{ads}^- + CO \rightarrow CO_2 + e^-$ GAS DETECTING REACTION : $O_o + NO_2 + e^- \rightarrow NO_3^-{}_{ads}$ $O_o$ : INTERSTITIAL OXYGEN

600 °C

700 °C

800 °C

900 °C

GAS SENSOR AND METHOD FOR PRODUCING ALKALINE EARTH FERRITE

CROSS-REFERENCE TO RELATED APPLICATIONS

This application is the U.S. national stage of PCT/JP2020/032227 filed on Aug. 26, 2020, which claims priority of Japanese Patent Application No. JP 2019-173525 filed on Sep. 24, 2019, the contents of which are incorporated herein.

TECHNICAL FIELD

The present disclosure relates to a gas sensor and a method for producing alkaline earth ferrite applicable to a gas detection member of a gas sensor.

BACKGROUND

In recent years, there is an increasing demand for monitoring specific gases such as carbon monoxide, carbon dioxide, or $NO_x$ in living environments such as in offices or homes, or in fields related to agriculture and biotechnology. Accompanied therewith, a gas sensor that detects these specific gases is proposed (see JP2017-106857A).

In the gas sensor as described in JP2017-106857A, a semiconductor containing tin oxide fine particles as a main component is often used as a gas detection member for detecting the gases.

SUMMARY

However, in the gas sensor in which tin oxide is used alone, since gas detection sensitivity will reach a plateau, when detecting, for example, $CO_2$ gas, it is necessary to ensure the detection sensitivity for a desired gas by coating surfaces of the tin oxide fine particles with an oxide of lanthanum (La) ($La_2O_3$), which has high reactivity with $CO_2$ gas. In this way, search for materials capable of exhibiting a gas detection ability for a specific gas continues.

Therefore, an object of the present disclosure is to provide a gas sensor using a material capable of exhibiting a gas detection ability for a desired gas without treating a surface of a gas detection material.

As a result of diligent research, the present inventors focus on a finding that a particle shape of a semiconductor material that constitutes the gas detection member of the gas sensor affects a resistance change between bulk resistance of the particles themselves and grain-boundary resistance among the particles, and complete the present disclosure based on this finding.

Therefore, a gas sensor according to one aspect of the present disclosure includes: a base material; a first electrode and a second electrode arranged on the base material; and a gas detection member connected to the first electrode and the second electrode, wherein the gas detection member contains flaky particles of alkaline earth ferrite.

According to this aspect, by using flaky particles of alkaline earth ferrite for the gas detection member, grain-boundary resistance between adjacent flaky particles of the alkaline earth ferrite can be reduced. Therefore, internal resistance of the gas detection member becomes relatively large when the flaky particles are used for the gas detection member as compared with a case where fine particles are used for the gas detection member, so that a change in the internal resistance due to adsorption of gas can be easily detected. Accordingly, the gas sensor using the flaky particles in the gas detection member can exhibit a gas detection ability for a desired gas.

DESCRIPTION OF EMBODIMENTS

Gas Sensor
Gas Sensor Configuration

An example of a gas sensor 10 according to an embodiment of the present disclosure will be described in detail with reference to the drawings.

Figure 1:
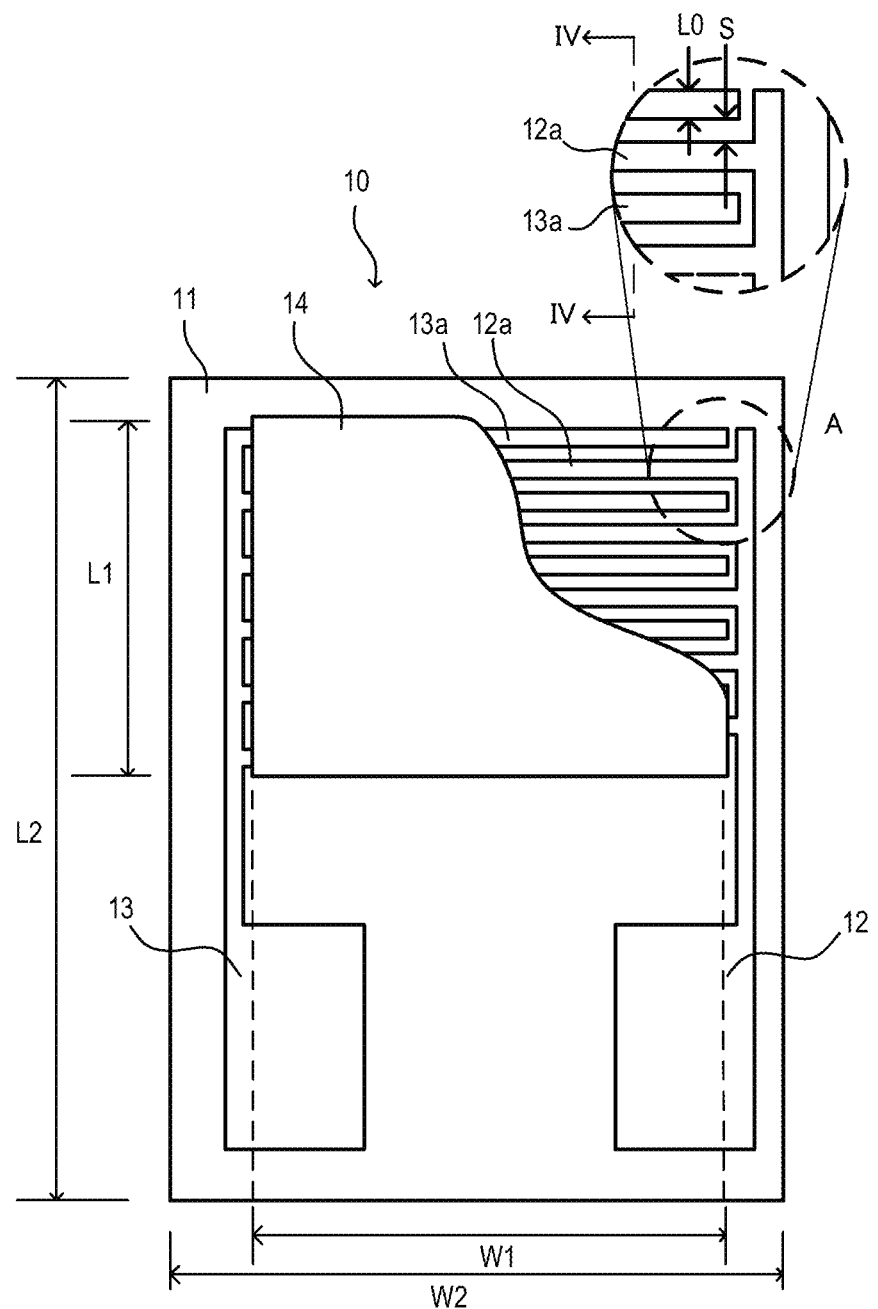
FIG. 1 is a plan view in which a part of a gas detection member of a thick-film gas sensor according to an embodiment of the present disclosure is cut out.

FIG. 1 is a plan view in which a part of a gas detection member 14 of the gas sensor 10 according to the embodiment of the present disclosure is cut out.

The gas sensor 10 shown in FIG. 1 includes a base material 11, a first electrode 12, a second electrode 13, and the gas detection member 14, and these parts constitute a thick-film sensor formed on the flat plate-shaped base material 11.

As the base material 11, an insulating material or a semi-insulating material can be used. As the insulating material, structural ceramics such as alumina, silicon dioxide, mullite, magnesium oxide, or forsterite, or glass, or sapphire, or the like can be used. As the semi-insulating material, silicon carbide or the like can be used. In addition, any material normally used as a base material for a gas sensor can be used as the base material 11.

When the flat plate-shaped base material 11 is used, the base material 11 may have a thickness of 0.05 mm or more and 1.0 mm or less. From the viewpoint of strength of the base material 11, the thickness of the base material 11 is preferably 0.09 mm or more. From the viewpoint of heat dissipation, the thickness of the base material 11 is preferably 1.0 mm or less.

Any material usually used as an electrode or a lead wire can be used as the first electrode 12 and the second electrode 13. As a conductive material, Cu, Al, Ag, Au, Pt, Ni, Cr, or Sn, or the like can be preferably used.

When a thick-film sensor as shown in FIG. 1 is formed, the first electrode 12 and the second electrode 13 both can be formed in a comb teeth shape. The first electrode 12 and the second electrode 13 are arranged such that on a surface of the base material 11, each of comb teeth 13a constituting the second electrode 13 is alternately disposed between each two of comb teeth 12a constituting the first electrode 12.

The first electrode 12 and the second electrode 13 can be formed on the surface of the base material 11 by pattern film formation using a sputtering method, an ion plating method, a vacuum deposition method, or a laser ablation method, or the like, depending on a metal element used. The first electrode 12 and the second electrode 13 can be formed by printing an electrode material on the surface of the base material 11. In addition, a connecting method such as wire bonding can also be used.

When the thick-film sensor is formed, the first electrode 12 and the second electrode 13 may have a thickness of 0.05 μm or more and 20 μm or less. From the viewpoint of detection performance for gas to be detected, the thickness is preferably 1 μm or more, and from the viewpoint of cost, the thickness is preferably 10 μm or less.

A distance between electrodes of the comb tooth 12a of the first electrode 12 and the comb tooth 13a of the second electrode 13 is 80 μm or more and 200 μm or less. Assuming that an electrode line width of the comb tooth 12a of the first electrode 12 and the comb tooth 13a of the second electrode 13 is L0, and a distance between the comb tooth 12a of the first electrode 12 and the comb tooth 13a of the second electrode 13 is S, a ratio of S to L0 (S/L0) may be 0.27 or more and 4.00 or less. From the viewpoint of sensor characteristics, the ratio is preferably 0.80 or more and 2.00 or less.

The gas detection member 14 is arranged so as to electrically connect the first electrode 12 to the second electrode 13. The gas detection member 14 is made of a material capable of electrically adsorbing gas molecules to be detected, and detects the gas molecules by utilizing a change in a resistance value accompanying the adsorption of the gas molecules.

In the present embodiment, alkaline earth ferrite is used as the material constituting the gas detection member 14. In the present embodiment, the gas detection member 14 can be manufactured by forming a paste of the alkaline earth ferrite constituting the gas detection member 14 using a binder and applying the paste to the base material 11 by using a screen printing method or the like. The paste may be mixed with an insulating material such as glass.

In the thick-film sensor as shown in FIG. 1, the gas detection member 14 is formed by coating a region having a predetermined length L1 and a width W1 so as to cover spaces between the comb teeth of the first electrode 12 and the second electrode 13.

In the thick-film gas sensor 10, the sensor characteristics are considered to be the best under a case of less overlap of flaky particles in a thickness direction and ensured conduction between the first electrode 12 and the second electrode 13. Considering this point, the gas detection member 14 may have a thickness of 0.05 μm or more and 10 μm or less.

As shown in FIG. 1, a predetermined area spanning the first electrode 12 and the second electrode 13 or only a space between the first electrode 12 and the second electrode 13 may be coated with the gas detection member 14. Although not shown in FIG. 1, an insulating layer may be arranged on the surface of the base material 11, and the first electrode 12 and the second electrode 13 may be arranged on the surface of the insulating layer.

Overall dimensions, a length L2, and a width W2 of the gas sensor 10 can be appropriately set to a size according to a usage environment of the gas sensor 10.

The gas sensor according to the present embodiment can also be configured as a tubular body.

Figure 2:
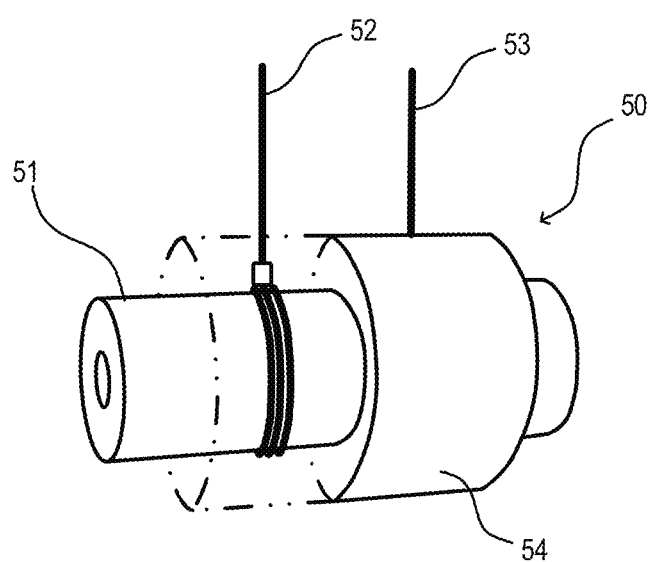
FIG. 2 is a schematic diagram for illustrating a tubular gas sensor according to an embodiment of the present disclosure.

FIG. 2 is a schematic diagram illustrating a tubular gas sensor 50. FIG. 2 describes a part cut out in order to make a configuration of the tubular gas sensor 50 easy to understand.

In a case of the tubular sensor, the base material 51 is formed into a tubular shape having a predetermined diameter, electrodes 52 and 53 are connected to the tubular base material 51 at a predetermined interval, and a material layer 54 constituting a gas detection member is formed around the tubular base material 51.

As an example, an alumina tube can be used as the base material 51, and platinum wires can be used as the electrodes 52 and 53. The tubular gas sensor 50 can be manufactured by connecting the platinum wires to the alumina tube and then applying the material layer 54 made of alkaline earth ferrite around the alumina tube and the platinum wires.

Although not shown in FIGS. 1 and 2, the gas sensor 10 is used together with a heater that heats the gas sensor 10 to a detection temperature of a gas to be detected. The heater may be integrally formed with the base material 11 of the gas sensor 10.

Explanation of Gas Detection Member

Figure 3:
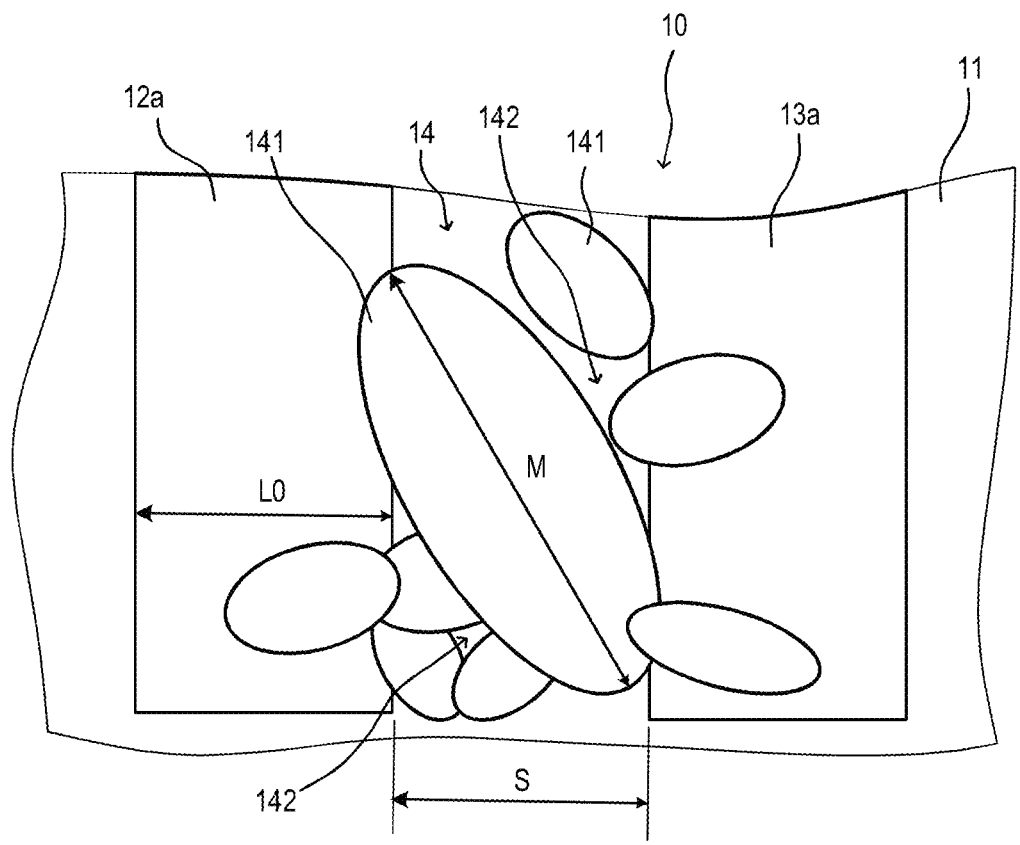
FIG. 3 is a schematic diagram schematically illustrating an enlarged region A shown in FIG. 1.
Figure 4:
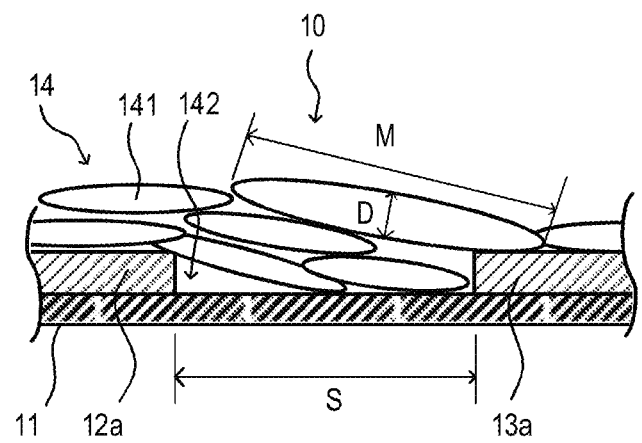
FIG. 4 is a cross-sectional view taken along a line IV-IV of FIG. 1.

FIG. 3 is a schematic diagram schematically illustrating an enlarged region A shown in FIG. 1. FIG. 4 is a cross-sectional view taken along a line IV-IV of FIG. 1.

The gas detection member 14 is made of flaky particles of alkaline earth ferrite. In the present embodiment, a flaky shape means a plate shape having a wide surface and a thickness remarkably small with respect to an expanding direction. As shown in FIG. 3, the gas detection member 14 is formed by aggregating flaky particles 141 of alkaline earth ferrite. Void portions 142 are formed in gaps between the flaky particles 141. In FIG. 3, in order to make the drawing easy to understand, some of the flaky particles 141 on the comb teeth 12a and 13a are omitted.

For the flaky particles 141, assuming that a length of the flaky particle 141 in a plane direction of the base material 11 is M, and a thickness of the flaky particle 141 is D, a ratio (M/D) of M to D may be 1 or more and 20 or less. The length M of the flaky particle 141 preferably satisfies M<(2L+2S). It means that one flaky particle 141 does not span three or more comb teeth 12a (or 13a).

Although not shown in FIGS. 3 and 4, each of the flaky particles 141 has a three-dimensional porous structure in which void portions made of fine pores and a continuous portion are continuous in a thickness direction. A total capacity of the fine pores in the flaky particles 141 is preferably 80 cm$^3$/g or more, and an average pore diameter of the fine pores is preferably 10 nm or more and 100 nm or less.

Among alkaline earth metals, it is preferable to use Mg or Ca because of low procurement cost and environmental burden. From the viewpoint of improving gas detection sensitivity, it is more preferable to use Ca.

From the viewpoint of improving the gas detection sensitivity, the alkaline earth ferrite preferably contains at least one dissimilar element selected from the group consisting of La, Sm, Si, Ti, Hf, and Zr. Among the above-mentioned dissimilar elements, it is preferable to use Zr since it is easy to obtain the desired fine pores.

From the viewpoint of achieving a total capacity of the fine pores in the flaky particles 141 of 80 cm$^3$/g or more and an average pore diameter of the fine pores of 10 nm or more and 100 nm or less, a content of the dissimilar element may be more than 0 mol % and 10 mol % or less, and is preferably 3 mol % or more and 7 mol % or less. When the content of the dissimilar element exceeds 10 mol %, the fine pores become difficult to form in the flaky particles 141.

That is, in the present embodiment, by using calcium ferrite ($CaFe_2O_4$) containing Zr as the alkaline earth ferrite, the gas detection member 14 having good gas detection sensitivity can be manufactured.

Functions and Effects

Figure 5:
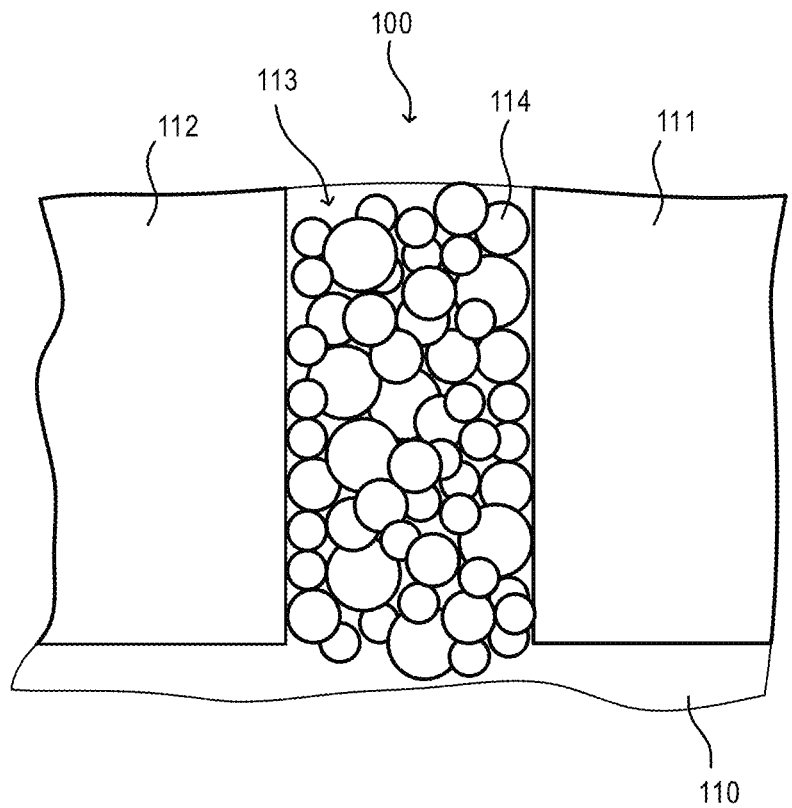
FIG. 5 is a schematic diagram for enlarging and illustrating a main part of a general gas sensor.
Figure 6:
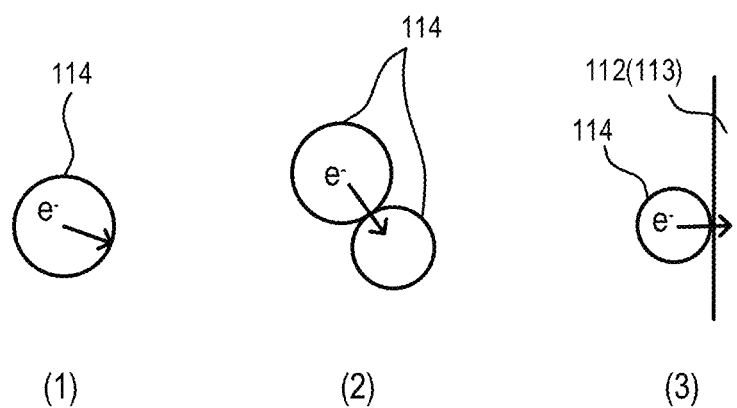
FIG. 6 is a schematic diagram for illustrating a resistance component of the gas sensor.

Detection performance of the gas sensor according to the present embodiment will be described. FIG. 5 is a schematic diagram for enlarging and illustrating a main part of a general gas sensor 100. FIG. 6 is a schematic diagram for illustrating a resistance component of the gas sensor.

FIG. 5 illustrates the gas sensor 100 including a first electrode 111 and a second electrode 112 arranged on a base material 110, and a gas detection member 113 electrically connected to the first electrode 111 and the second electrode 112. In FIG. 5, in order to make the drawing easy to understand, fine particles 114 on the first electrode 111 and the second electrode 112 are omitted.

The resistance component generated inside the alkaline earth ferrite constituting the gas detection member of the gas sensor includes three components shown in FIG. 6.

(1) Bulk resistance $R_b$, which is an internal resistance of the oxide fine particles 114;
(2) Grain-boundary resistance $R_{gb}$ between fine particles 114 in contact with each other; and
(3) Electrode interface resistance $R_e$ between the fine particles 114 and the first electrode 111 (or the second electrode 112).

That is, a total resistance ($R_{all}$) of the gas detection member can be expressed by the sum of the bulk resistance ($R_b$), the grain-boundary resistance ($R_{gb}$), and the electrode interface resistance ($R_e$).

Figure 7:
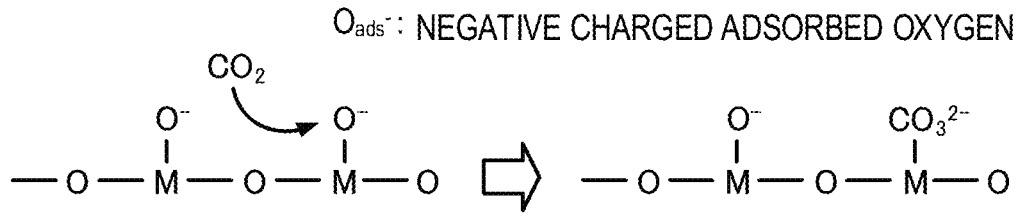
FIG. 7 is a schematic diagram for explaining a mechanism by which $CO_2$ gas is detected in alkaline earth ferrite.

FIG. 7 is a schematic diagram for explaining a mechanism by which $CO_2$ gas is detected in alkaline earth ferrite. In the gas sensor 10 according to the present embodiment, for example, a case where the gas to be detected is an acid gas such as $CO_2$ will be described. Since $CO_2$ exhibits Lewis acidity, it is considered that $CO_2$ strongly interacts with a surface of the alkaline earth ferrite. Particularly by using $CaFe_2O_4$ as the alkaline earth ferrite, it is possible to form the gas detection member 14 that strongly interacts with the acid gas.

It is considered that when $CO_2$ is detected, oxygen adsorbed on a surface of $CaFe_2O_4$ as negative charges is involved. $CaFe_2O_4$ is a p-type semiconductor. $CO_2$ reacts with oxygen ($O^-$, $O^{2-}$) adsorbed on the surface of the alkaline earth ferrite as negative charges to form $CO_3^{2-}$. Therefore, the Hall concentration increases. That is, an electric resistance decreases. The reaction between $O^-$ or $O^{2-}$, which is the adsorbed oxygen, and $CO_2$ is expressed by the following formula.

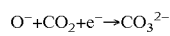

$$O^- + CO_2 + e^- \rightarrow CO_3^{2-}$$

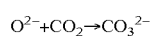

$$O^{2-} + CO_2 \rightarrow CO_3^{2-}$$

Since $CaFe_2O_4$ is a p-type semiconductor, the Hall concentration increases with respect to $CO_2$. Therefore, the electric resistance decreases due to adsorption of $CO_2$ gas.

Since the gas detection sensitivity is defined by an electric resistance change rate ($\Delta R$) or an electric resistance ratio (S), it is easier to read an electric signal when the electric resistance decreases than when the electric resistance increases due to gas adsorption. Therefore, it is considered that the gas detection sensitivity can be increased.

Figure 8:
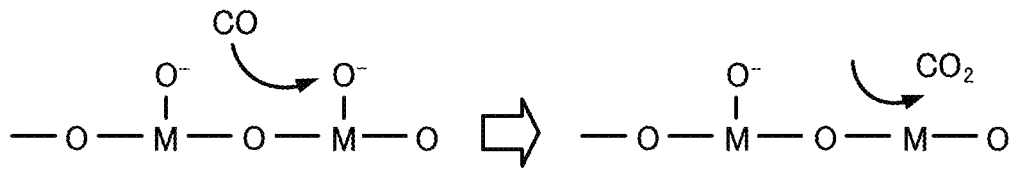
FIG. 8 is a schematic diagram for explaining a mechanism by which CO gas is detected in alkaline earth ferrite.

FIG. 8 is a schematic diagram for explaining responsiveness of the alkaline earth ferrite to CO gas. For CO, as shown in FIG. 8, reaction between CO and oxygen (O⁻) adsorbed as negative charges is considered to cause a decrease in the Hall concentration as expressed by the following formula.

$$M\text{-}O^-_{ads} + CO \rightarrow CO_2 + e^-$$

Since the Hall concentration of $CaFe_2O_4$ decreases with respect to CO, a resistance value of the gas detection member 14 increases when CO is detected.

Figure 9:
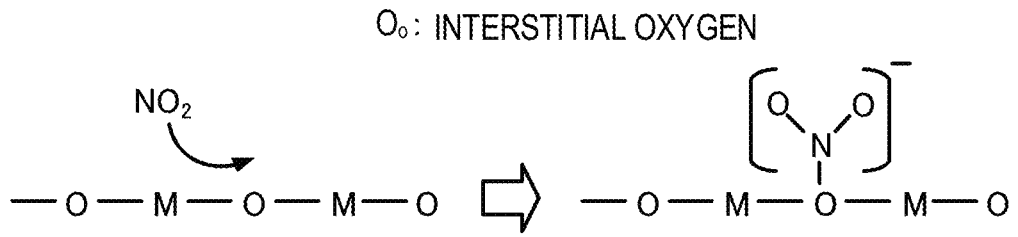
FIG. 9 is a schematic diagram for explaining a mechanism by which $NO_2$ gas is detected in alkaline earth ferrite.

FIG. 9 is a schematic diagram for explaining responsiveness of the alkaline earth ferrite to $NO_2$ gas. As shown in FIG. 9, it is considered that interstitial oxygen ($O_o$) on the surface of the alkaline earth ferrite is involved in the responsiveness to $NO_2$.

With respect to $NO_2$, when $NO_2$ reacts with interstitial oxygen ($O_o$), the Hall concentration increases as expressed by the following formula. Therefore, when $NO_2$ is detected, the resistance value of the gas detection member 14 decreases.

$$O_o + NO_2 + e^- \rightarrow NO_3^-$$

Gases such as $CO_2$, CO, and $NO_2$ can be detected by causing the resistance value to change as described above in $CaFe_2O_4$ due to adsorption of the gases.

The electric resistance change rate represents a ratio of a change amount in resistance in the gas to be detected ($R_{gas}$) with respect to resistance in air ($R_{air}$) to the resistance in air ($R_{air}$), and is calculated by $\Delta R = (R_{air} - R_{gas})/R_{air}$.

The electric resistance ratio (S) represents a ratio of the resistance in the gas to be detected ($R_{gas}$) to the resistance in air ($R_{air}$), and is calculated by $S = R_{air}/R_{gas}$.

In representing the gas detection sensitivity, the electric resistance change rate ($\Delta R$) and the electric resistance ratio (S) can be treated equally with each other, but in general, when the electric resistance change rate ($\Delta R$) is two digits or more, the gas detection sensitivity may be expressed using the electric resistance ratio (S). In each drawing of the present application, the electric resistance ratio (S) is used to represent the gas detection sensitivity.

Figure 10:
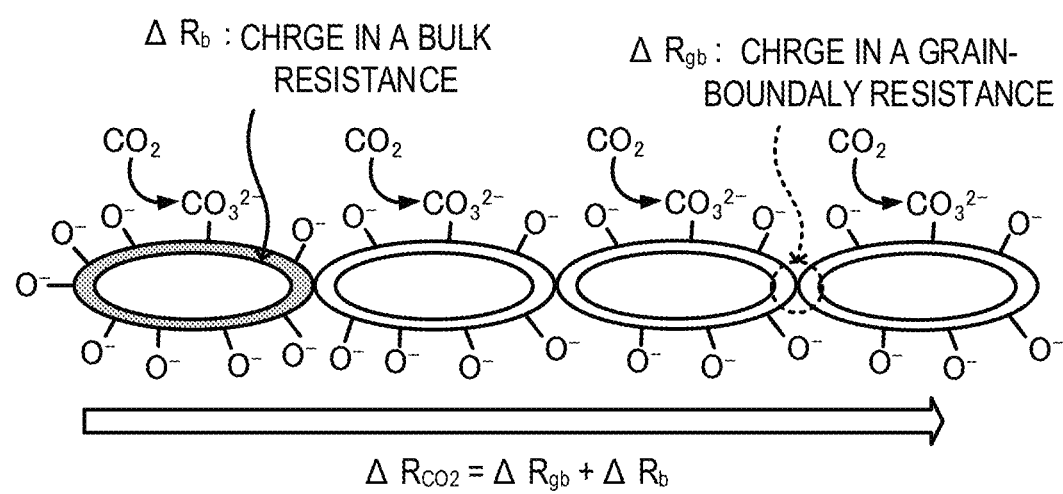
FIG. 10 is a schematic diagram for explaining $CO_2$ gas detection of a sensor using flaky particles.

FIG. 10 is a schematic diagram for explaining $CO_2$ gas detection of a sensor using flaky particles. An electric resistance change rate of $CO_2$ gas ($\Delta R_{CO2}$) can be calculated from the grain-boundary resistance $R_{gb}$ and the bulk resistance ($R_b$).

In the gas sensor 10 according to the present embodiment, as shown in FIGS. 3 and 4, since the flaky particles 141 are coarser than the fine particles 114 shown in FIG. 5, in the gas detection member 14, there are few contact points between the flaky particles 141. Therefore, in the gas detection member 14 made of the flaky particles 141, the bulk resistance ($R_b$) component is dominant in the relation that the total resistance $R_{all}$ of the gas detection member 14=the bulk resistance ($R_b$)+the grain-boundary resistance ($R_{gb}$).

Therefore, when the general gas sensor 100 and the gas sensor 10 according to the present embodiment are manufactured under the same electrode material, electrode line width, electrode thickness, and distance between electrodes, in the gas sensor 10, it is considered that the electric resistance change (bulk resistance) of the alkaline earth ferrite is easy to appear in the resistance change during adsorption of the gas to be detected.

Method for Producing Alkaline Earth Ferrite

Next, a method for producing the alkaline earth ferrite constituting the gas detection member 14 of the gas sensor 10 according to the present embodiment will be described.

The method for producing the alkaline earth ferrite according to the present embodiment includes: a step of preparing a mixed solution of a plurality of kinds of metal ions, which is a starting material; a step of adding an organic acid to the obtained mixed solution to prepare a precursor solution containing a metal-organic acid complex; a step of evaporating and drying the precursor solution to obtain a precursor; a step of performing a first calcination process on the precursor; and a step of performing a second calcination process after the first calcination process.

In the present embodiment, the first calcination process is a process of calcining at 300° C. or higher and 600° C. or lower for 10 minutes or longer and 120 minutes or shorter, and the second calcination process is a process of calcining at 600° C. or higher and 1400° C. or lower for 1 hour or longer and 24 hours or shorter. In the second calcination process, it is preferable to set a process time to an upper limit side on a lower limit temperature side of an effective temperature range, and it is preferable to set the process time to a lower limit side on an upper limit temperature side of the effective temperature range. For example, in a case of 600° C., the process time is preferably 20 hours or longer.

When the alkaline earth ferrite contains a dissimilar element, the method includes a step of adding the dissimilar element to the mixed solution in the form of a metal salt or an alkoxide.

Specifically, as the alkaline earth ferrite, alkaline earth ferrite ($AFe_2O_4$, A=Mg, and Ca) can be used. The starting material may be any material that can dissolve the metal ions, and may be a nitrate such as magnesium (II) nitrate, calcium (II) nitrate, and iron (III) nitrate, a carbonate, or a metal oxide.

When producing $MgFe_2O_4$, magnesium (II) nitrate and iron (III) nitrate are dissolved in a solvent described later to prepare the mixed solution.

When producing $CaFe_2O_4$, calcium (II) nitrate and iron (III) nitrate are dissolved in a solvent to prepare the mixed solution. In the present embodiment, deionized water or an organic solvent such as methanol, ethanol, acetylacetone, or ethylene glycol can be used as the solvent for the mixed solution of a plurality of kinds of metal ions as the starting material.

In order to form the finally obtained alkaline earth ferrite particles into a flaky and three-dimensional porous structure, it is preferable to use ethanol.

The organic acid equal to a total number of moles of the metal ions is added to the mixed solution obtained as described above. As the organic acid, malic acid, malonic acid, and the like can be preferably used as long as the organic acid can form a stable chelate complex with the plurality of kinds of metal ions. It is preferable to use malic acid from the viewpoint of flaking and coarsening the alkaline earth ferrite particles obtained in the subsequent step.

When the alkaline earth ferrite contains a dissimilar element, at least one can be selected from the group consisting of Sm, La, Si, Ti, Hf, and Zr as the dissimilar element.

These dissimilar elements can be introduced into the alkaline earth ferrite by mixing with the above mixed solution in the form of a metal nitrate or an alkoxide.

When Sm or La is added, it is preferable to use a metal nitrate of Sm or La. When Si, Ti, Hf, or Zr is added, it is preferable to use alkoxides thereof. As an example, tetraethyl orthosilicate can be used as an alkoxide of silicon (Si), titanium isopropoxide can be used as an alkoxide of titanium (Ti), and hafnium ethoxide can be used as an alkoxide of hafnium (Hf).

In the present embodiment, an adding amount of the dissimilar element is preferably 10 mol % or less, and more preferably 3 mol % or more and 7 mol % or less, in terms of mole fraction with respect to a total number of moles of the alkaline earth ferrite.

The obtained precursor is subjected to the first calcination process. The first calcination process is a process for removing residual organic substances such as carbonic acid, nitric acid, malic acid, and ethanol in a reaction system, and a temperature of the first calcination process can be set to a temperature higher than a thermal decomposition temperature of the organic acid. From this point, in the present embodiment, the temperature of the first calcination process is 300° C. or higher and 600° C. or lower for 10 minutes or longer and 120 minutes or shorter.

Following the first calcination process, the second calcination process is performed. In the second calcination process, from the viewpoint of obtaining high-purity alkaline earth ferrite and forming a porous surface of the alkaline earth ferrite, the second calcination process is performed at 600° C. or higher and 1400° C. or lower for 1 hour or longer and 24 hours or shorter.

Figure 11:
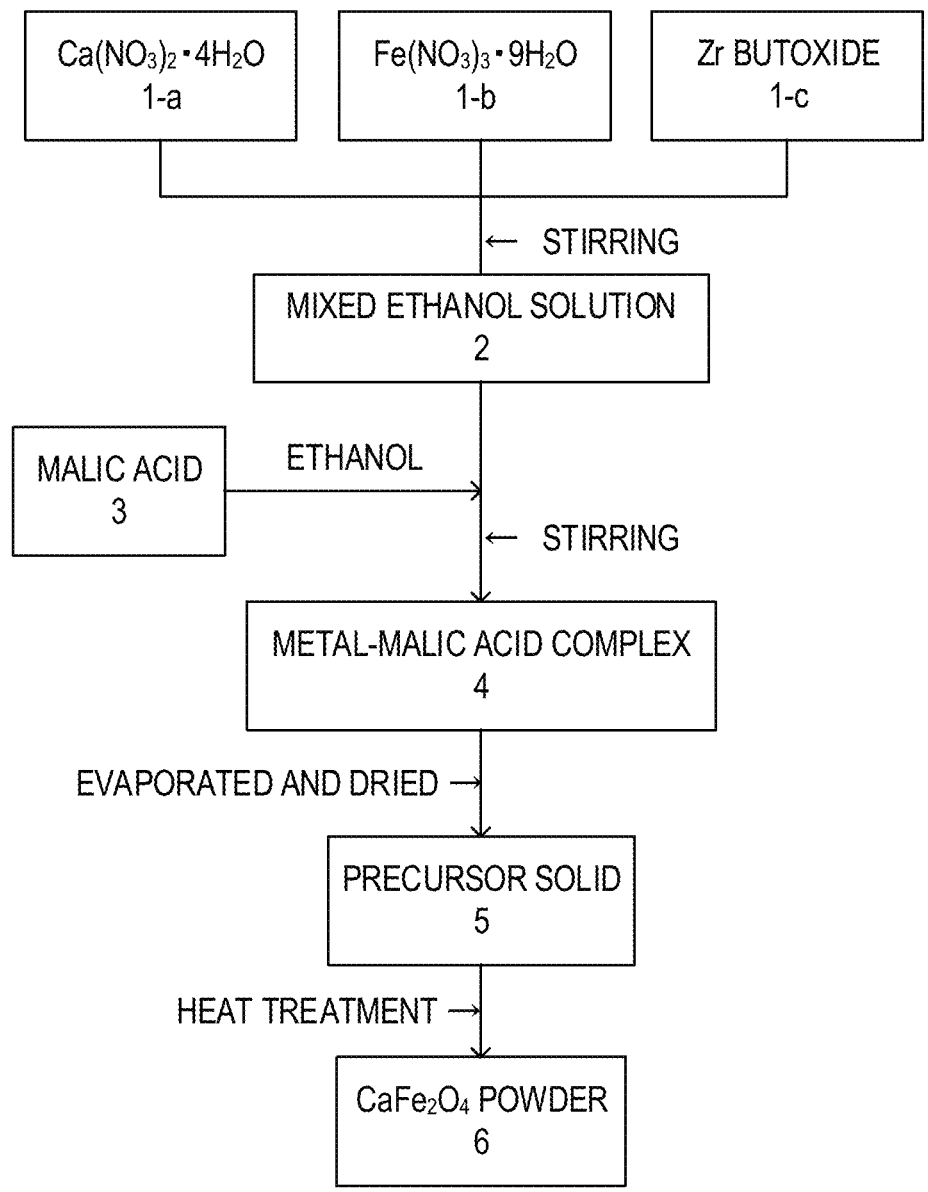
FIG. 11 is a diagram for illustrating a method for manufacturing a gas detection member containing a flaky element according to the present embodiment.

FIG. 11 is a diagram for explaining the method for producing the alkaline earth ferrite according to the present embodiment. In the present embodiment, as an example as shown in FIG. 11, a solution prepared by dissolving a starting material consisting of nitrates 1-*a* and 1-*b* of Ca and Fe and an alkoxide 1-*c* of Zr in ethanol at a stoichiometric ratio is used as a mixed solution 2, and malic acid 3 is added to the mixed solution 2 and Zr is added as a dissimilar element to prepare a metal-malic acid complex 4. Next, the solution 4 is evaporated and dried to produce a precursor solid 5.

In the present embodiment, the solution 4 containing the metal-organic acid complex is held at a temperature of 80° C. to 120° C. for 1 hour for dehydration or deethanolation. Then, the solution 4 is heated at a temperature of 180° C. to 220° C. for 3 hours. In this way, thermal decomposition of nitrate can be promoted. Subsequently, heat treatment is performed under a temperature of 300° C. to 500° C. for 30 minutes in atmosphere to remove the residual organic substances. Further, the obtained precursor solid 5 is pulverized into a powder to obtain $CaFe_2O_4$ powder 6.

By the above operations, $CaFe_2O_4$ powder which is flaky and has a three-dimensional porous structure of 100 nm or less can be obtained.

Other Embodiments

Although the embodiment of the present disclosure have been described above, the above-mentioned embodiment is merely a part of application examples of the present disclosure, and does not mean that the technical scope of the present disclosure is limited to the specific configuration of the above-mentioned embodiment.

For example, the shape of the base material 11 of the gas sensor 10 is not limited to that shown in FIG. 1 or FIG. 2. The shapes of the comb teeth 12*a* and 13*a* and the shape of a lead portion from the comb teeth are not limited to those shown in FIG. 1.

EXAMPLES

A gas sensor according to the embodiment of the present disclosure was manufactured, and gas detection performance and the like of the manufactured gas sensor were measured. Hereinafter, a method for manufacturing a test piece and evaluation thereof will be described.

Manufacture of Test Piece
Production of Alkaline Earth Ferrite
Test Pieces 1 to 8
Test Piece 1: Production of $MgFe_2O_4$ Magnesium (III) nitrate and iron (III) nitrate are used as a starting material. These nitrates were dissolved in deionized water, and malic acid equal to a total number of moles of metal ions was added to prepare a metal-organic acid complex solution. The solution was evaporated and dried to obtain a precursor powder. The obtained precursor powder was subjected to a first calcination process in air at 400° C. for 2 hours. Then, a second calcination process was performed at 800° C. for 2 hours. As a result, $MgFe_2O_4$ applicable to a gas detection member of the test piece was obtained.

Test Piece 2: Production of $MgFe_2O_4$ with La Added

A nitrate of lanthanum (La) was used as a metal source for a dissimilar metal to be added. Lanthanum nitrate was prepared so that an adding amount of La was 5 mol % with respect to $MgFe_2O_4$, and magnesium (III) nitrate, iron (III) nitrate, and lanthanum nitrate were dissolved in deionized water. Malic acid equal to a total number of moles of metal ions was added to prepare a metal-organic acid complex solution. The solution was evaporated and dried in the same manner as for the test piece 1 to obtain a precursor powder. The same calcination process as for the test piece 1 was performed to obtain $MgFe_2O_4$ with La added.

Test Piece 3: Production of $MgFe_2O_4$ with Sm Added

Samarium (Sm) was used as a dissimilar metal to be added. Samarium nitrate was prepared so that an adding amount of Sm was 5 mol % with respect to $MgFe_2O_4$, and a metal-organic acid complex solution was prepared in the same manner as for the test piece 2. Hereinafter, in the same manner as for the test piece 1, $MgFe_2O_4$ with Sm added was obtained.

Test Piece 4: Production of $CaFe_2O_4$ $CaFe_2O_4$ applicable to a gas detection member of a test piece 4 was obtained by the same operations as for the test piece 1 except that calcium (III) nitrate and iron (III) nitrate were used as the starting material, the first calcination process was performed at 400° C. for 2 hours, and then the second calcination process was performed at 700° C. for 12 hours.

Test Piece 5: Production of $CaFe_2O_4$ with Si Added

Silicon (Si) was used as a dissimilar metal to be added. An alkoxide of Si (tetraethyl orthosilicate) was prepared so that an adding amount of Si was 5 mol % with respect to $CaFe_2O_4$, and mixed with calcium (III) nitrate and iron (III) nitrate. Conditions of the first calcination process and the second calcination process were the same as those for the test piece 4, and $CaFe_2O_4$ with Si added was obtained.

Test Piece 6: Production of $CaFe_2O_4$ with Ti Added

Titanium (Ti) was used as a dissimilar metal to be added. An alkoxide of Ti (titanium isopropoxide) was prepared so that an adding amount of Ti was 5 mol % with respect to $CaFe_2O_4$, and mixed with calcium (III) nitrate and iron (III) nitrate. Conditions of the first calcination process and the second calcination process were the same as those for the test piece 4, and $CaFe_2O_4$ with Ti added was obtained.

Test Piece 7: Production of $CaFe_2O_4$ with Zr Added

Zirconium (Zr) was used as a dissimilar metal to be added. An alkoxide of Zr was prepared so that an adding amount of Zr was 5 mol % with respect to $CaFe_2O_4$, and mixed with calcium (III) nitrate and iron (III) nitrate. Conditions of the first calcination process and the second calcination process were the same as those for the test piece 4, and $CaFe_2O_4$ with Zr added was obtained.

Test Piece 8: Production of $CaFe_2O_4$ with Hf Added

Hafnium (Hf) was used as a dissimilar metal to be added. An alkoxide of Hf (hafnium ethoxide) was prepared so that an adding amount of Hf was 5 mol % with respect to $CaFe_2O_4$, and mixed with calcium (III) nitrate and iron (III) nitrate. Conditions of the first calcination process and the second calcination process were the same as those for the test piece 4, and $CaFe_2O_4$ with Hf added was obtained.

Test Pieces 9 to 12

Subsequently, a sensor detection material for evaluating performance of the gas detection member by changing the adding amount of Zr was produced. In manufacturing the following test pieces, each nitrate of Ca and Fe and Zr alkoxide were prepared so that a composition of the sensor detection material was $CaFe_{2-x}Zr_xO_4$.

Test Piece 9: $CaFe_2O_4$ with 3 mol % of Zr Added

In the present example, calcium (II) nitrate tetrahydrate $(Ca(NO_3)_2 \cdot 4H_2O$ (purity 99%)), iron (III) nitrate nonahydrate $(Fe(NO_3)_3 \cdot 9H_2O$ (purity 99%)), and Zr butoxide (Zirconium (IV) butoxide (85% 1-butanol solution)) were used as the starting material.

For these, the starting material was prepared at a molar ratio of calcium nitrate, iron nitrate, Zr alkoxide and organic acid (malic acid) of 1:2 to 0.06:0.06:3, and these components were mixed to obtain a metal-organic acid complex solution. Subsequently, the solution was evaporated and dried to obtain a precursor solid. The obtained precursor solid was pulverized and heat-treated at 700° C. for 12 hours in atmosphere to obtain a substance having a composition formula of $CaFe_{1.84}Zr_{0.06}O_4$.

Test Piece 10: $CaFe_2O_4$ with 5 mol % of Zr Added

The same operations as for the test piece 9 were performed to obtain a substance having a composition formula of $CaFe_{1.90}Zr_{0.10}O_4$ except that the starting material was prepared at a molar ratio of calcium nitrate, iron nitrate, Zr alkoxide, and organic acid (malic acid) of 1:2 to 0.10:0.10:3.

Test Piece 11: $CaFe_2O_4$ with 7 mol % of Zr Added

The same operations as for the test piece 9 were performed to obtain a substance having a composition formula of $CaFe_{1.86}Zr_{0.14}O_4$ except that the starting material was prepared at a molar ratio of calcium nitrate, iron nitrate, Zr alkoxide, and organic acid (malic acid) of 1:2 to 0.14:0.14:3.

Test Piece 12: $CaFe_2O_4$ with 10 mol % of Zr Added

The same operations as for the test piece 9 were performed to obtain a substance having a composition formula of $CaFe_{1.80}Zr_{0.20}O_4$ except that the starting material was prepared at a molar ratio of calcium nitrate, iron nitrate, Zr alkoxide, and organic acid (malic acid) of 1:2 to 0.20:0.20:3.

Test Pieces 13 to 17

Test Piece 13: $CaFe_2O_4$ with 5 mol % of Zr Added

The same operations as for the test piece 10 were performed except that the heat treatment was performed at 600° C. for 12 hours.

Test Piece 14: $CaFe_2O_4$ with 5 mol % of Zr Added

The heat treatment was performed at 700° C. for 12 hours. That is, it is the same substance as the test piece 10.

Test Piece 15: $CaFe_2O_4$ with 5 mol % of Zr Added

The same operations as for the test piece 10 were performed except that the heat treatment was performed at 800° C. for 12 hours.

Test Piece 16: $CaFe_2O_4$ with 5 mol % of Zr Added

The same operations as for the test piece 10 were performed except that the heat treatment was performed at 900° C. for 12 hours.

Test Piece 17: $CaFe_2O_4$ by Solid Phase Reaction Method

For the test piece 17, $CaFe_2O_4$ was prepared by using a solid phase reaction method. A plurality of kinds of raw material powders ($CaCO_3$, $\alpha\text{-}Fe_2O_3$) made of the starting material were weighed in a predetermined amount and mixed. $CaCO_3$ having a purity of 99% and $\alpha\text{-}Fe_2O_3$ having a purity of 99% were used. $CaCO_3$ and $\alpha\text{-}Fe_2O_3$ were mechanically pulverized and mixed, and then heat-treated in atmosphere at 700° C. to 900° C. for 12 hours to obtain $CaFe_2O_4$ powder.

Test Pieces 18 to 20

Test Piece 18: Tubular Gas Sensor Using $CaFe_2O_4$

A tubular gas sensor described later was manufactured using the material of the test piece 4.

Test Piece 19: Thick-film Gas Sensor Using $CaFe_2O_4$

A thick-film gas sensor described later was manufactured using the material of the test piece 4.

Test Piece 20: Thick-film Gas Sensor Using $CaFe_2O_4$ with 5 mol % of Zr Added

A thick-film gas sensor described later was manufactured using the material of the test piece 10.

Manufacture 1 of Gas Sensor

An alumina tube was used as the base material, and platinum (Pt) was used as the electrode material to manufacture the tubular gas sensor illustrated in FIG. 2. An alumina tube having a diameter of 3.0 mm was used, and the distance between the electrodes 52 and 53 was set to 1.0 mm.

A paste of $MgFe_2O_4$ or $CaFe_2O_4$ of the test pieces 1 to 8 was prepared using 5 mass % of ethyl cellulose-α-terpineol as a binder, and the alumina tube was coated with the obtained paste and dried at 600° C. for 2 hours.

Manufacture 2 of Gas Sensor

An alumina substrate was used as the base material, and gold (Au) was used as the electrode material to manufacture the thick-film gas sensor illustrated in FIG. 1.

The distance S between each of the comb teeth 12a of the first electrode 12 and each of the comb teeth 13a of the second electrode 13 was set to 80 μm, and the electrode line width L0 of the comb teeth 12a of the first electrode 12 and the comb teeth 13a of the second electrode 13 was set to 100 μm. The number of the comb teeth on the first electrode 12 and the second electrode 13 was set to 17. That is, a total number of the comb teeth was 34, and the number of gaps between the comb teeth 12a and the comb teeth 13a was 33.

After the coating, the alumina substrate was dried at 150° C. for 10 minutes and then heat-treated at 600° C. for 2 hours to obtain a gas sensor as a test piece.

Evaluation Circuit

Figure 12:
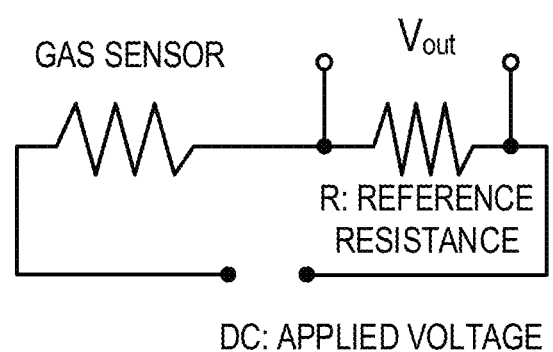
FIG. 12 is a circuit diagram for illustrating an evaluation circuit for evaluating performance of the gas sensor.

FIG. 12 is a circuit diagram for illustrating an evaluation circuit for evaluating detection performance of the gas sensor. A change in a resistance value of the gas sensor when a predetermined voltage was applied to a circuit in which the obtained gas sensor and an external resistance were connected in series was measured.

Evaluation of Gas Sensor

Surface Morphology of $CaFe_2O_4$

Surface morphology of a part of the obtained test pieces 1 to 17 was observed using a scanning electron microscope (SEM) "made by JEOL, model name: JSM-6700F". These results are shown in FIGS. 13 to 25.

Gas Detection Performance Evaluation ($CO_2$)

$CO_2$ detection performance of a gas sensor was evaluated using synthetic dry air or $CO_2$ diluted with synthetic dry air (gas concentration: 5000 ppm) as a gas to be detected. $CO_2$ was circulated through the gas sensor of the test piece at a flow rate of 0.10 dm³/min, and a change in a resistance value was measured. A detection temperature was set to 250° C. to 500° C. The electric resistance ($R_{air}$) of the gas sensor when in the synthetic dry air and the electric resistance ($R_{gas}$) of the gas sensor when exposed to the synthetic dry air containing $CO_2$, which is the gas to be detected, were measured, and the electric resistance ratio (S), which is a ratio thereof ($R_{air}/R_{gas}$), was taken as the gas detection sensitivity. Results are shown in FIGS. 26 to 30.

CO

Figure 31:
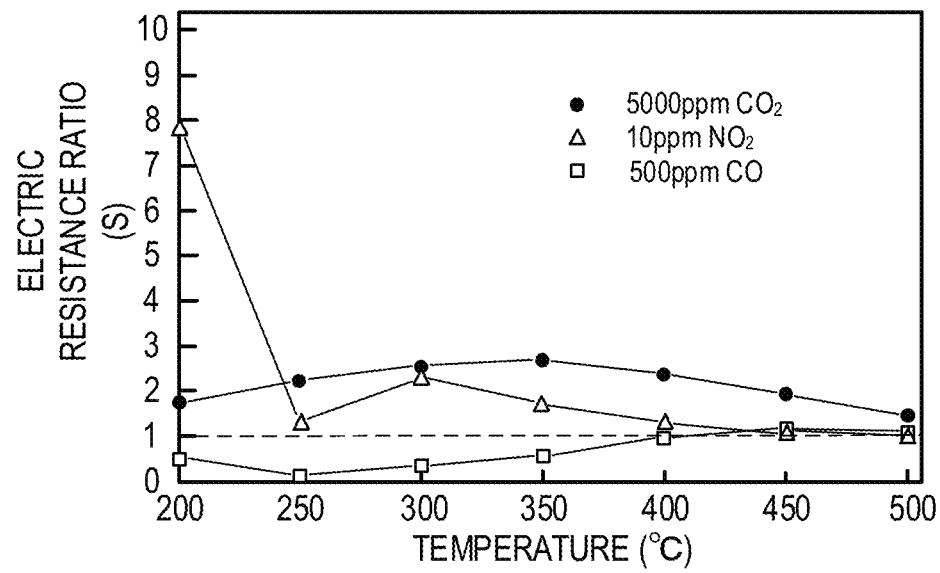
FIG. 31 is a diagram illustrating detection performance of $CaFe_2O_4$ for $CO_2$, CO and $NO_2$.
Figure 32:
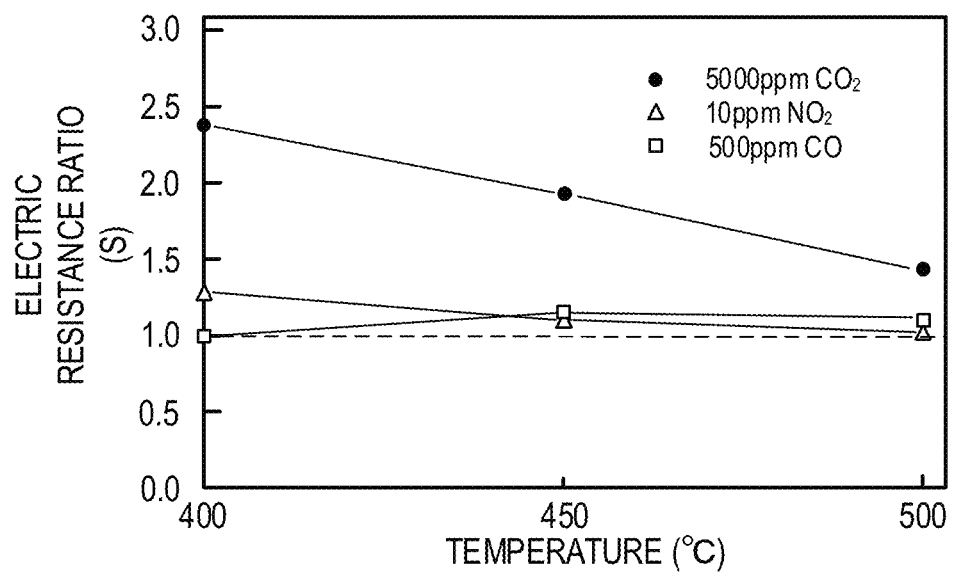
FIG. 32 is a diagram illustrating the detection performance of $CaFe_2O_4$ for $CO_2$, CO and $NO_2$.

CO detection performance was evaluated in the same manner as the $CO_2$ evaluation except that carbon monoxide CO (gas concentration: 500 ppm) was used as the gas to be detected. Above results are shown in FIGS. 31 and 32.

$NO_2$ $NO_2$ detection performance was evaluated in the same manner as the $CO_2$ evaluation except that nitrogen dioxide $NO_2$ (gas concentration: 10 ppm) was used as the gas to be detected.

Evaluation Result

Surface Morphology of $CaFe_2O_4$

Figure 13:
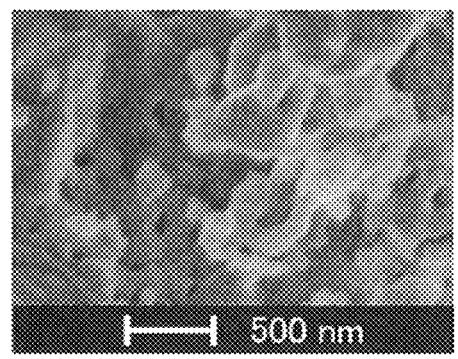
FIG. 13 is a diagram illustrating an SEM image of a test piece 4 ($CaFe_2O_4$).
Figure 14:
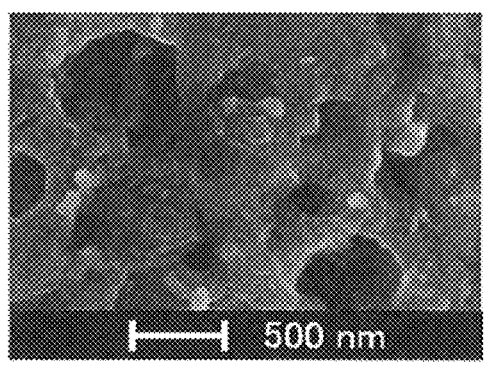
FIG. 14 is a diagram illustrating an SEM image of a test piece 5 ($CaFe_2O_4$ with Si added) magnified 50,000 times.
Figure 15:
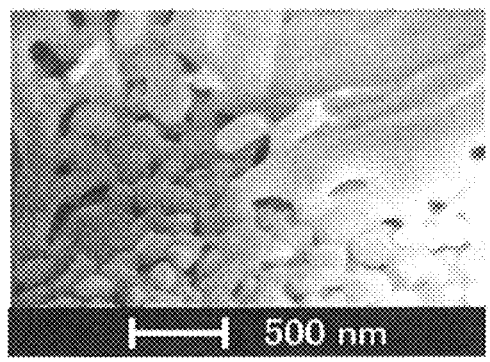
FIG. 15 is a diagram illustrating an SEM image of a test piece 6 ($CaFe_2O_4$ with Ti added) magnified 50,000 times.
Figure 16:
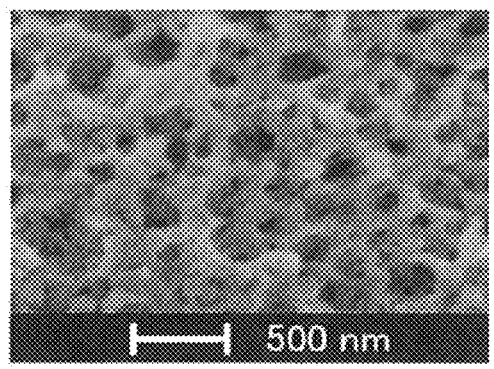
FIG. 16 is a diagram illustrating an SEM image of a test piece 7 ($CaFe_2O_4$ with Zr added) magnified 50,000 times.
Figure 17:
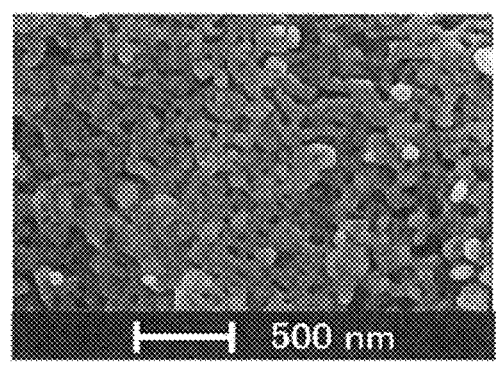
FIG. 17 is a diagram illustrating an SEM image of a test piece 8 ($CaFe_2O_4$ with Hf added) magnified 50,000 times.

FIG. 13 is a diagram illustrating an SEM image of the test piece 4 ($CaFe_2O_4$). FIG. 14 is a diagram illustrating an SEM image of the test piece 5 ($CaFe_2O_4$ with Si added). FIG. 15 is a diagram illustrating an SEM image of the test piece 6 ($CaFe_2O_4$ with Ti added). FIG. 16 is a diagram illustrating an SEM image of the test piece 7 ($CaFe_2O_4$ with Zr added). FIG. 17 is a diagram illustrating an SEM image of the test piece 8 ($CaFe_2O_4$ with Hf added).

From the SEM images shown in FIGS. 13 to 17, it was found that $CaFe_2O_4$ has a porous structure. It was also found that a surface structure thereof becomes finer by mixing Si, Ti, Zr, or Hf as the dissimilar element with $CaFe_2O_4$. Especially, it was found that when Ti or Hf is added, the surface of $CaFe_2O_4$ can be made finer, and when Si or Zr is added, a three-dimensional porous structure is promoted on the surface of $CaFe_2O_4$.

Among the above test pieces, a good three-dimensional porous structure was confirmed when Zr was added, so that the surface morphology was observed by changing the adding amount of Zr to $CaFe_2O_4$.

Figure 18:
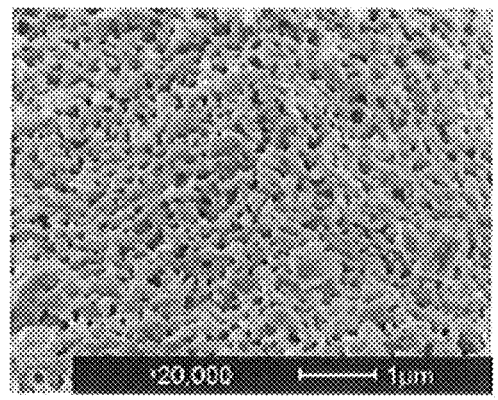
FIG. 18 is a diagram illustrating an SEM image of a test piece 9 ($CaFe_2O_4$ with 3 mol % of Zr added) magnified 20,000 times.
Figure 19:
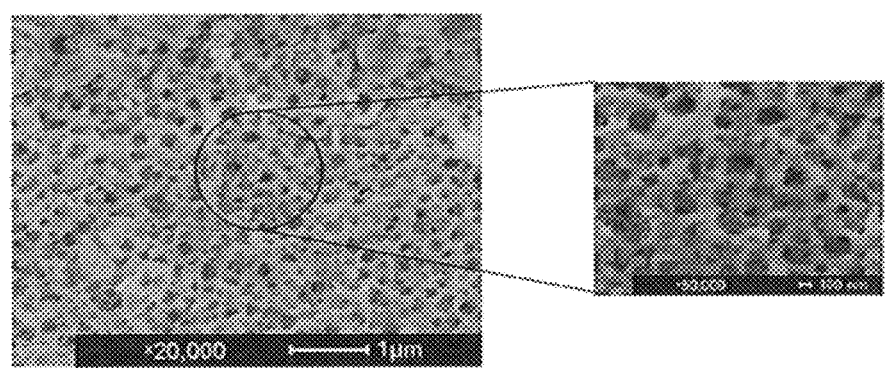
FIG. 19 is a diagram illustrating an SEM image of a test piece 10 ($CaFe_2O_4$ with 5 mol % of Zr added) magnified 20,000 times.
Figure 20:
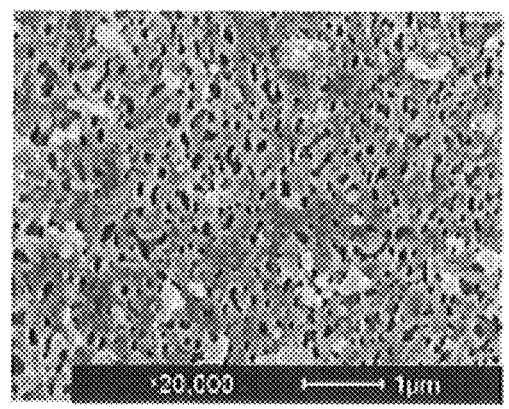
FIG. 20 is a diagram illustrating an SEM image of a test piece 11 ($CaFe_2O_4$ with 7 mol % of Zr added) magnified 20,000 times.
Figure 21:
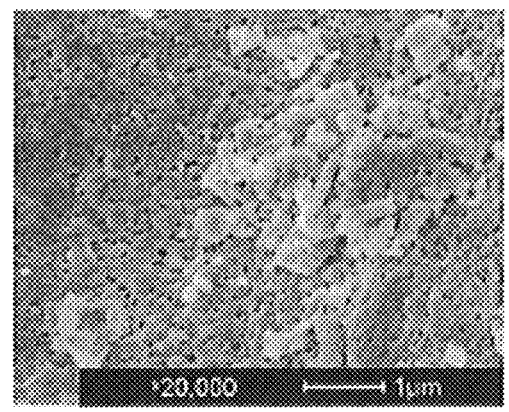
FIG. 21 is a diagram illustrating an SEM image of a test piece 12 ($CaFe_2O_4$ with 10 mol % of Zr added) magnified 20,000 times.

FIG. 18 is a diagram illustrating an SEM image of the test piece 9 ($CaFe_2O_4$ with 3 mol % of Zr added) magnified 20,000 times. FIG. 19 is a diagram illustrating an SEM image of the test piece 10 ($CaFe_2O_4$ with 5 mol % of Zr added) magnified 20,000 times. FIG. 20 is a diagram illustrating an SEM image of the test piece 11 ($CaFe_2O_4$ with 7 mol % of Zr added) magnified 20,000 times. FIG. 21 is a diagram illustrating an SEM image of the test piece 12 ($CaFe_2O_4$ with 10 mol % of Zr added) magnified 20,000 times.

As shown in FIG. 18, when 3 mol % Zr was added, fine pores having a pore diameter of 100 nm or less could be confirmed on the surface. As shown in FIG. 19, when 5 mol % of Zr was added, it was confirmed that fine pores on the surface were increased and a specific surface area was increased.

As shown in FIGS. 20 and 21, it was found that when 7 mol % of Zr is added, and further when 10 mol % of Zr is added, the number of pores in the three-dimensional porous structure on the surfaces of the test pieces 11 and 12 tends to decrease as compared with the case of 5 mol %. Accordingly, it was found that although the addition of Zr can promote the three-dimensional porous structure on the surface of $CaFe_2O_4$, the adding amount has to be appropriate, and when the adding amount is too large, the three-dimensional porous structure regresses.

Figure 22:
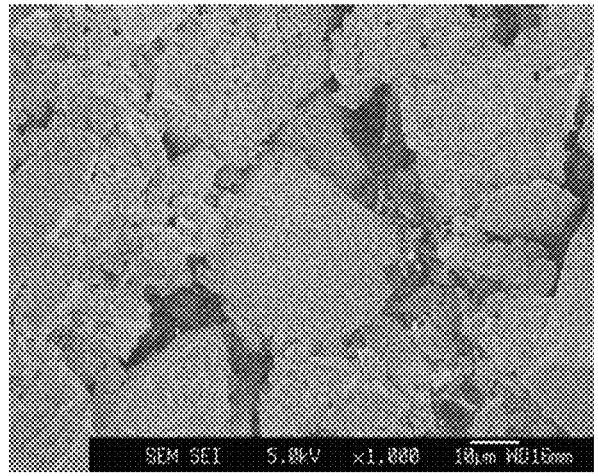
FIG. 22 is a diagram illustrating the SEM image of the test piece 10 ($CaFe_2O_4$ with 5 mol % of Zr added) magnified 1,000 times.
Figure 23:
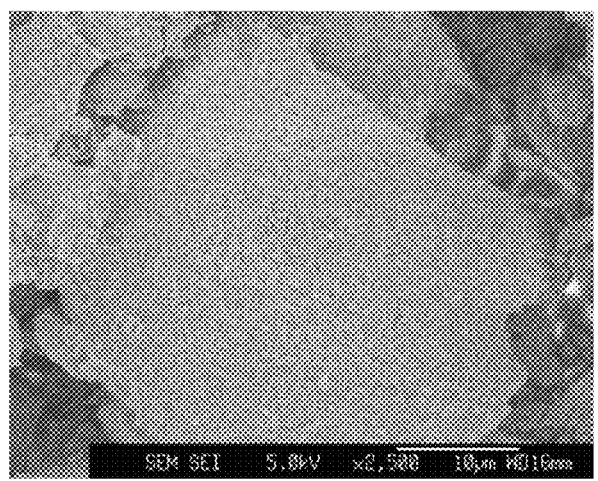
FIG. 23 is a diagram illustrating the SEM image of the test piece 10 ($CaFe_2O_4$ with 5 mol % of Zr added) magnified 2,500 times.

FIG. 22 is a diagram illustrating an SEM image of the test piece 10 ($CaFe_2O_4$ with 5 mol % of Zr added) magnified 1,000 times. FIG. 23 is a diagram illustrating an SEM image of the test piece 10 ($CaFe_2O_4$ with 5 mol % of Zr added) magnified 2,500 times.

According to FIGS. 22 and 23, in $CaFe_2O_4$ with 5 mol % of Zr added, particles of $CaFe_2O_4$ are flaky, and the whole structure is a structure including void portions between the flaky particles, and it was found that each of the flaky particles has a three-dimensional porous structure when viewed further microscopically.

From FIG. 23, it can be actually measured that the length of the flaky particles in the plane direction is about 39 μm.

Figure 24:
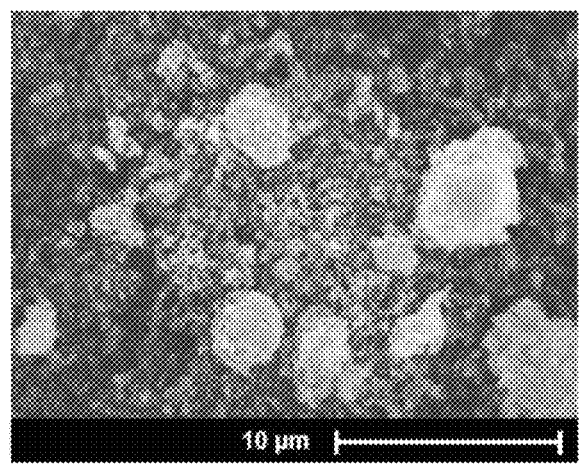
FIG. 24 is a diagram illustrating the SEM images of the test pieces 11 and 12.

FIG. 24 is a diagram illustrating an SEM image of the test piece 17. In $CaFe_2O_4$ obtained by the solid phase reaction method, although refinement of $CaFe_2O_4$ itself was promoted, the three-dimensional porous structure could not be confirmed on the surface of $CaFe_2O_4$.

Figure 25A:
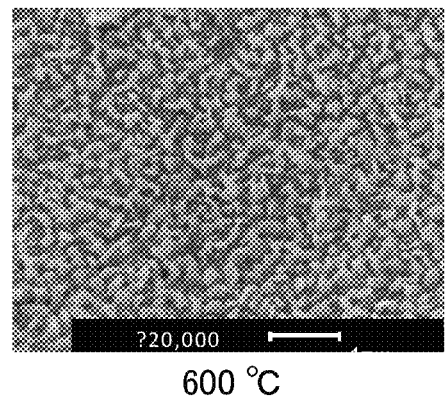
FIG. 25A is an SEM image of a surface of a test piece 13 obtained by performing heating, which corresponds to a second calcination process, for 12 hours and under a temperature of 600° C.
Figure 25B:
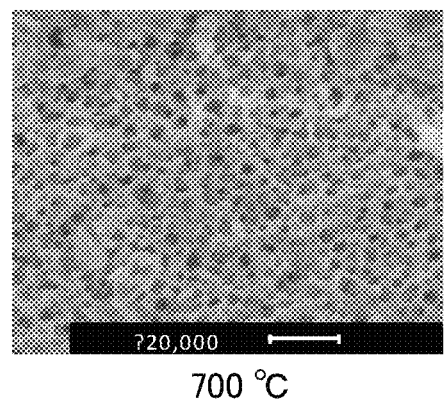
FIG. 25B is an SEM image of a surface of a test piece 14 obtained by performing heating, which corresponds to the second calcination process, for 12 hours and under a temperature of 700° C.
Figure 25C:
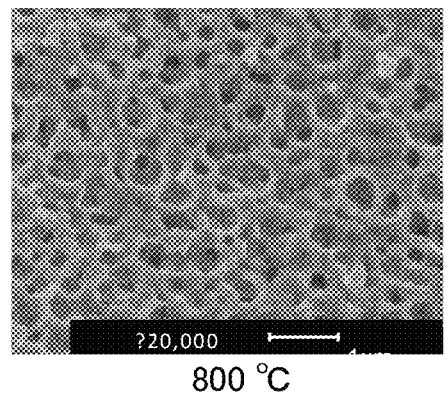
FIG. 25C is an SEM image of a surface of a test piece 15 obtained by performing heating, which corresponds to the second calcination process, for 12 hours and under a temperature of 800° C.
Figure 25D:
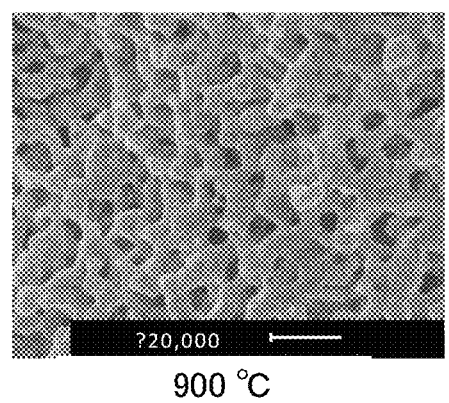
FIG. 25D is an SEM image of a surface of a test piece 16 obtained by performing heating, which corresponds to the second calcination process, for 12 hours and under a temperature of 900° C.

FIG. 25A is an SEM image of a surface of the test piece 13 obtained when heating corresponding to the second calcination process is performed for 12 hours at 600° C., FIG. 25B is an SEM image of a surface of the test piece 14 obtained when heating corresponding to the second calcination process is performed for 12 hours at 700° C., FIG. 25C is an SEM image of a surface of the test piece 15 obtained when heating corresponding to the second calcination process is performed for 12 hours at 800° C., and FIG. 25D is an SEM image of a surface of the test piece 16 obtained when heating corresponding to the second calcination process is performed for 12 hours at 900° C.

From these results, the three-dimensional porous structure could not be confirmed when the heating temperature of the second calcination process was 600° C., but as the heating temperature was increased, the three-dimensional porous structure can be refined. Accordingly, it was found that the heating temperature of the second calcination process is preferably 700° C. or higher.

Gas Detection Performance Evaluation Result

Figure 26:
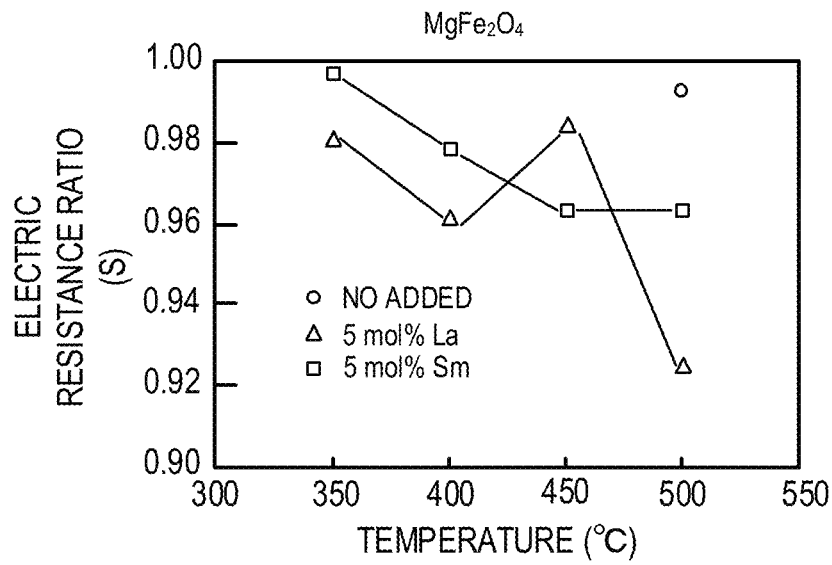
FIG. 26 is a diagram illustrating gas detection performance of test pieces 1 to 3.

The gas detection performance of the $MgFe_2O_4$-type sensors of the test pieces 1 to 3 and the $CaFe_2O_4$-type sensors of the test pieces 4 to 8 was evaluated. FIG. 26 is a diagram illustrating the gas detection performance of the test pieces 1 to 3. The gas detection performance was evaluated by the above-mentioned electric resistance ratio (S). A thick-film gas sensor was used for an evaluation test.

FIG. 26 shows $CO_2$ gas sensitivity at each temperature of the gas sensor manufactured by using each of the test piece 1, with no dissimilar element added ($MgFe_2O_4$), the test piece 2 with 5 mol % of La added, and the test piece 3 with 5 mol % of Sm added. In the case of $MgFe_2O_4$, which is an n-type semiconductor, when $CO_2$ gas is adsorbed, an electron concentration decreases, so that the resistance increases after the gas adsorption. That is, it is calculated as S<1.

As shown in FIG. 26, it was found that the $MgFe_2O_4$ sensor with La or Sm added can detect $CO_2$ at a lower temperature side as compared with the sensor without addition. $MgFe_2O_4$ with La added showed maximum sensitivity at 500° C. It was confirmed that the $MgFe_2O_4$ sensor exhibits $CO_2$ gas sensitivity by adding a dissimilar element.

Figure 27:
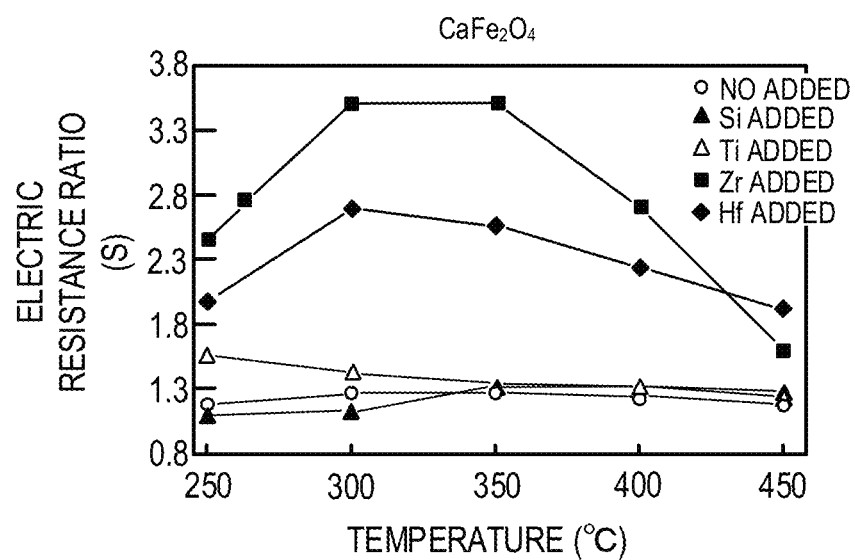
FIG. 27 is a diagram illustrating gas detection performance of the test pieces 4 to 8.

FIG. 27 is a diagram showing the gas detection performance of the test pieces 4 to 8. The gas detection performance was evaluated by the electric resistance ratio (S). A tubular gas sensor was used for an evaluation test.

FIG. 27 shows $CO_2$ gas sensitivity at each temperature of the gas sensor manufactured by using each of the test pieces of $CaFe_2O_4$ with various types of metal elements added. In the case of $CaFe_2O_4$, which is a p-type semiconductor, when $CO_2$ gas is adsorbed, the Hall concentration increases, so that the electric resistance decreases after the gas adsorption. That is, it is calculated as S>1.

As shown in FIG. 27, the $CaFe_2O_4$ sensor with Hf or Zr added showed high $CO_2$ sensitivity, and particularly showed maximum sensitivity at a measurement temperature of 300° C. to 350° C. It was found that the $CaFe_2O_4$ sensor with Zr added provides rapid responsiveness at approximately 350° C.

Based on the performance evaluation shown in FIG. 27, when Zr among the various kinds of metal elements was used, the performance of the gas detection member by changing the adding amount of Zr was evaluated. $CO_2$ was used as the gas to be detected. The gas detection performance was evaluated by the electric resistance ratio (S). A tubular gas sensor was used for an evaluation test. Results are shown in FIG. 28.

Figure 28:
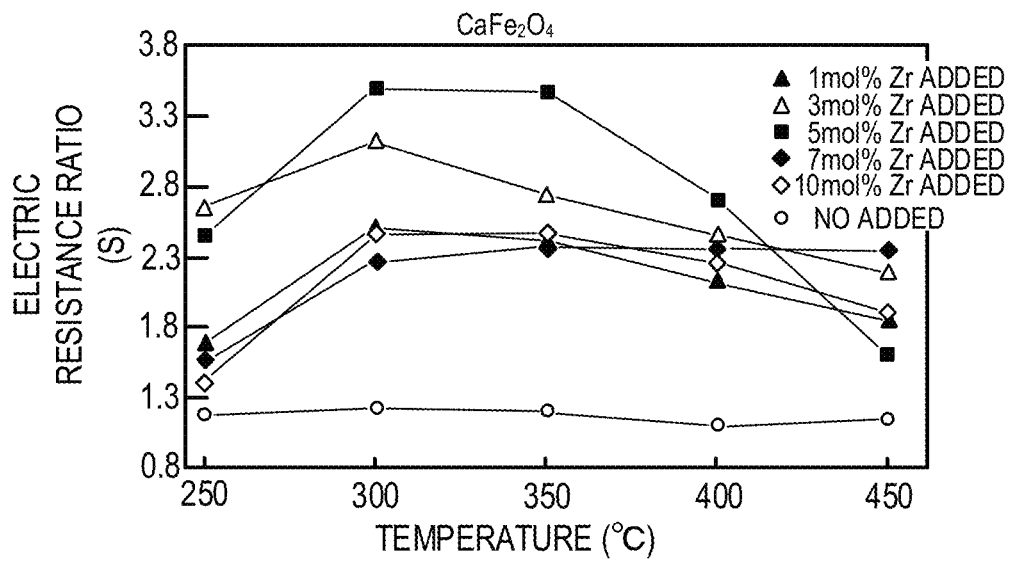
FIG. 28 is a diagram illustrating gas detection performance of the test pieces 9 to 12.

As shown in FIG. 28, the $CaFe_2O_4$ sensor with Zr added shows the best $CO_2$ sensitivity when the adding amount of Zr is 5 mol %, and particularly shows the maximum sensitivity at a measurement temperature of 300° C. to 350° C.

Furthermore, the gas detection performance of the test piece 17 manufactured by the solid phase reaction method and the test piece 9, which is $CaFe_2O_4$ with 5 mol % of Zr added was evaluated. $CO_2$ was used as the gas to be detected, and the gas detection performance was evaluated by the electric resistance ratio (S). A tubular gas sensor was used for an evaluation test. Results are shown in FIG. 29.

Figure 29:
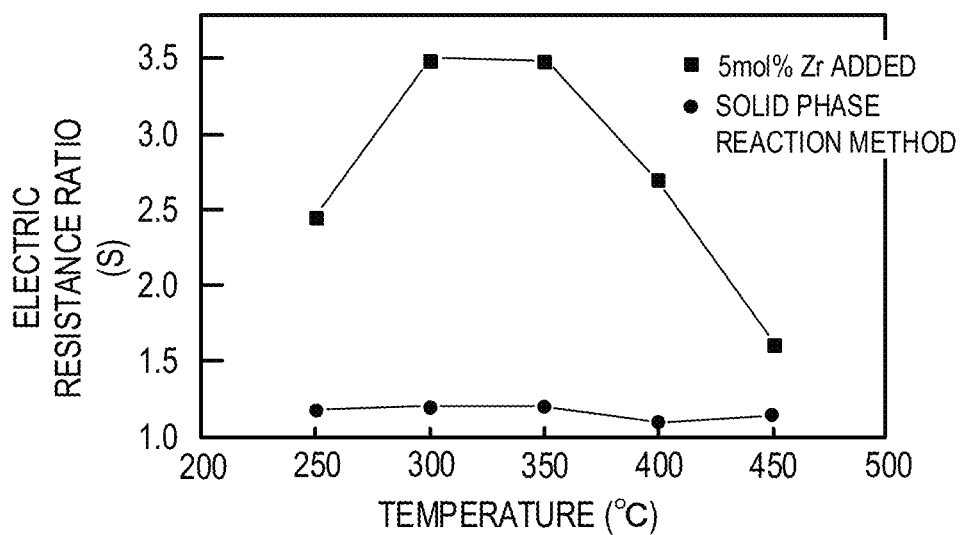
FIG. 29 is a diagram illustrating gas detection performance of the test piece 9 and a test piece 17.

FIG. 29 is a diagram illustrating the gas detection performance of the test piece 9 and the test piece 17. As shown in FIG. 29, it was found that the $CaFe_2O_4$ sensor with Zr added exhibits sensitivity to $CO_2$, and has better $CO_2$ sensitivity than the $CaFe_2O_4$ sensor using the test piece 17 manufactured by the solid phase reaction method.

As described with reference to FIGS. 22, 23, and 24, in $CaFe_2O_4$ with 5 mol % of Zr added, the $CaFe_2O_4$ particles are flaky, and the whole structure is a structure including void portions between the flaky particles. It was found that each of the $CaFe_2O_4$ flaky particles has a three-dimensional porous structure when viewed further microscopically. It was found that $CaFe_2O_4$ with 5 mol % of Zr added exhibits sensitivity to $CO_2$ by having such a structure, and has better $CO_2$ sensitivity than the $CaFe_2O_4$ sensor using the test piece 17 manufactured by the solid phase reaction method.

Figure 30:
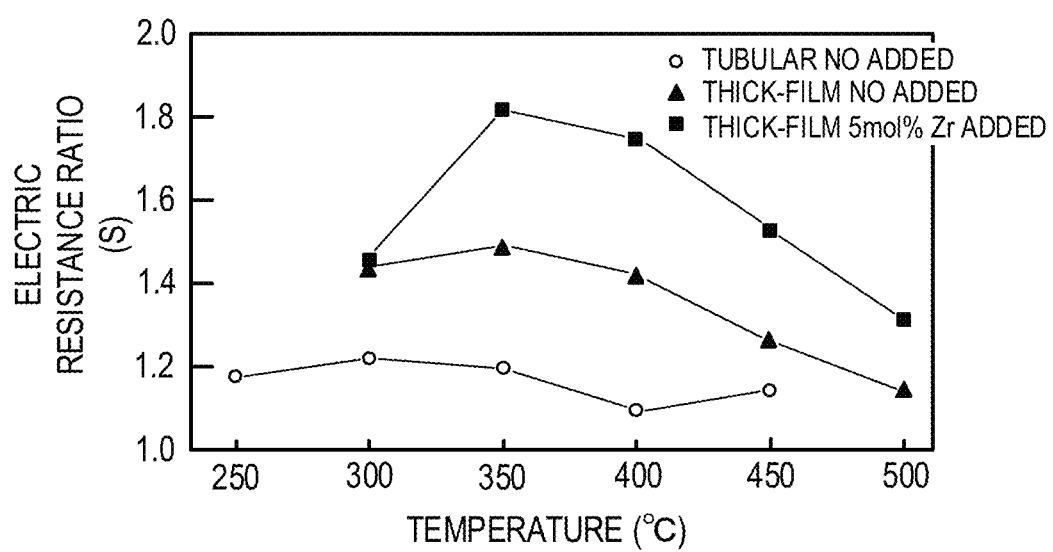
FIG. 30 is a diagram illustrating $CO_2$ gas detection performance in the tubular gas sensor and the thick-film gas sensor.

Subsequently, a difference in $CO_2$ gas detection performance between the tubular gas sensor and the thick-film gas sensor was evaluated. FIG. 30 is a diagram illustrating the $CO_2$ gas detection performance in the tubular gas sensor and the thick-film gas sensor.

For each of the tubular gas sensor (test piece 18) using $CaFe_2O_4$ as the gas detection member, the thick-film gas sensor (test piece 19) using $CaFe_2O_4$ as the gas detection member, and the thick-film gas sensor (test piece 20) using $CaFe_2O_4$ with 5 mol % of Zr added as the gas detection member, the electric resistance ratio (S) was evaluated using $CO_2$ as the gas to be detected.

FIG. 30 shows that the thick-film gas sensor has better $CO_2$ gas detection sensitivity than the tubular gas sensor. Therefore, by configuring the gas sensor in a thick-film shape, the detection performance for the gas to be detected can be further improved.

Accordingly, it is considered that the gas detection sensitivity is improved by using a gas detection member made of a resistor material containing flaky particles since the change in electric resistance (bulk resistance) of the alkaline earth ferrite tends to appear in the change in resistance during adsorption of the gas to be detected.

Therefore, by combining the flaky particles and the thick-film gas sensor, superiority of the flaky particles can be enhanced, so that the gas detection sensitivity can be further improved.

Next, results of evaluating the detection performance for gases other than $CO_2$ will be described.

In addition to $CO_2$, the detection performance for CO and $NO_2$ was evaluated using the gas sensor of the test piece 20, that is, a thick-film gas sensor having a gas detection member made of a resistor material containing $CaFe_2O_4$ with 5 mol % of Zr added.

FIGS. 31 and 32 are diagrams illustrating detection performance for $CO_2$, CO, and $NO_2$. According to FIGS. 31 and 32, with respect to $CO_2$, the electric resistance ratio (S) peaks in the vicinity of 350° C. and changes to a value larger than 1 in a temperature range of at least 200° C. to 500° C. This is because, as described with reference to FIG. 7, $CaFe_2O_4$ is a p-type semiconductor and the Hall concentration thereof increases corresponding to the adsorption of $CO_2$, so that the electric resistance of $CaFe_2O_4$ decreases due to the adsorption of $CO_2$.

Accordingly, it is recognized that when $CaFe_2O_4$ is used as the alkaline earth ferrite, $CO_2$ can be detected in a temperature range of approximately 200° C. to 500° C. It is also clear that the $CO_2$ detection performance is exhibited as already described with reference to FIGS. 26 to 30.

With respect to CO, the electric resistance ratio (S) peaks in 250° C. and changes in a direction of decreasing by more than 1 in a temperature range of at least 200° C. or less to 400° C. This is because, as described with reference to FIG. 8, the Hall concentration of $CaFe_2O_4$ decreases corresponding to the adsorption of CO, so that the electric resistance of $CaFe_2O_4$ increases due to the adsorption of CO.

With respect to $NO_2$, the electric resistance ratio (S) peaks in 200° C. and changes in a direction of increasing more than 1 in a temperature range of approximately 450° C. or less. This is because, as described with reference to FIG. 9, the Hall concentration of $CaFe_2O_4$ increases corresponding to the adsorption of $NO_2$, the electric resistance of $CaFe_2O_4$ decreases due to the adsorption of $NO_2$.

From the above, it was found that the gas sensor shown as the Example has the detection performance not only for $CO_2$ but also for CO and $NO_2$.

The present application claims priority under Japanese Patent Application No. 2019-173525 filed to the Japan Patent Office on Sep. 24, 2019, and an entire content of this application is incorporated herein by reference.

The invention claimed is:

1. A gas sensor, comprising:
a base material;
a first electrode and a second electrode arranged on the base material; and
a gas detection member connected to the first electrode and the second electrode, wherein
the gas detection member contains flaky particles of alkaline earth ferrite, wherein an electric resistance of the gas detection member is changed by reacting between oxygen adsorbed on a surface of the alkaline earth ferrite as negative charges with a gas.

2. The gas sensor according to claim 1, wherein the gas detection member contains the flaky particles and void portions which are gaps between the flaky particles.

3. The gas sensor according to claim 1, wherein each of the flaky particles has a three-dimensional porous structure.

4. The gas sensor according to claim 1, wherein a ratio of a length of the flaky particle in a plane direction of the base material to a thickness of the flaky particle (length/thickness) is between 1 and 20.

5. The gas sensor according to claim 4, wherein the alkaline earth ferrite contains at least one dissimilar element selected from the group consisting of La, Sm, Si, Ti, Hf, and Zr.

6. The gas sensor according to claim 5, wherein a content of the dissimilar element is 10 mol % or less.

7. The gas sensor according to claim 6, wherein a content of the dissimilar element is between 3 mol % and 7 mol %.

8. The gas sensor according to claim 4, wherein the alkaline earth ferrite is $CaFe_2O_4$.

9. The gas sensor according to claim 8, wherein the dissimilar element is Zr.

10. A method for producing a gas sensor, comprising:
providing a base material, a first electrode, a second electrode and a gas detection member;
arranging the first electrode and the second electrode onto the base material; and
connecting the gas detection member to the first electrode and the second electrode, wherein the gas detection member contains a plurality of flaky particles of alkaline earth ferrite, wherein the alkaline earth ferrite is prepar executing the following steps:
a step of preparing a mixed solution of a plurality of kinds of metal ions, which is a starting material;
a step of adding an organic acid to the mixed solution to prepare a precursor solution containing a metal-organic acid complex;
a step of evaporating and drying the precursor solution to obtain a precursor;
a step of performing a first calcination process on the precursor; and
a step of performing a second calcination process after the first calcination process, wherein the first calcination process is a process of calcining at 300° C. or higher and 600° C. or lower for 10 minutes or longer and 120 minutes or shorter, and
the second calcination process is a process of calcining at 600° C. or higher and 1400° C. or lower for 1 hour or longer and 24 hours or shorter, wherein an electric resistance of the gas detection member is changed by reacting between oxygen adsorbed on a surface of the alkaline earth ferrite as negative charges with a gas.

* * * * *